US012725609B2

(12) United States Patent
Barros et al.

(10) Patent No.: US 12,725,609 B2
(45) **Date of Patent: *Sep. 1, 2026**

(54) HOTWORDING BY DEGREE

(71) Applicant: Google LLC, Mountain View, CA (US)

(72) Inventors: Brett Aladdin Barros, San Mateo, CA (US); James Flynn, Cambridge, MA (US); Theo Goguely, Mountain View, CA (US)

(73) Assignee: Google LLC, Mountain View, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 18/735,706

(22) Filed: Jun. 6, 2024

(65) Prior Publication Data

US 2024/0331683 A1 Oct. 3, 2024

Related U.S. Application Data

(63) Continuation of application No. 17/305,806, filed on Jul. 14, 2021, now Pat. No. 12,014,727.

(51) Int. Cl.
*G10L 15/22* (2006.01)
*G10L 15/08* (2006.01)

(52) U.S. Cl.
CPC .............. *G10L 15/08* (2013.01); *G10L 15/22* (2013.01); *G10L 2015/088* (2013.01)

(58) Field of Classification Search
None
See application file for complete search history.

(56) References Cited

U.S. PATENT DOCUMENTS 9,275,637 B1 3/2016 Salvador et al.
2006/0293886 A1 12/2006 Odell et al.
(Continued)

FOREIGN PATENT DOCUMENTS

JP 2020-503568 A 1/2020
WO 2018125292 A1 7/2018
WO 2021091573 A1 5/2021

OTHER PUBLICATIONS

European Patent Office, Communication Pursuant to Article 94(3) for Application 22751601.0 dated Jun. 26, 2025.
(Continued)

*Primary Examiner* — Seong-Ah A Shin
(74) *Attorney, Agent, or Firm* — Honigman LLP; Brett A. Krueger; Grant Griffith

(57) ABSTRACT

A method for a soft acceptance of a hotword receives audio data characterizing a soft hotword event detected by a hotword detector in streaming audio captured by a user device. The method also processes the audio data to determine that the audio data corresponds to a query specifying an action to perform on the user device. Without triggering performance of the action on the user device or the other device, the method provides a notification for output from the user device where the notification prompts a user associated with the user device to provide an affirmative input indication in order to trigger performance of the action on the user device or the other device and, when the user fails to provide the affirmative input indication, instructs the user device or the other device to not perform the action specified by the query.

12 Claims, 7 Drawing Sheets

(56) References Cited

U.S. PATENT DOCUMENTS

2012/0089392 A1* 4/2012 Larco .................. G10L 15/22 704/E21.001
2013/0138439 A1 5/2013 Marcus et al.
2014/0012586 A1 1/2014 Rubin et al.
2014/0188476 A1* 7/2014 Li .................. G10L 15/222 704/254
2014/0278413 A1* 9/2014 Pitschel .................. G10L 15/22 704/243
2015/0310865 A1* 10/2015 Fay .................. G10L 15/01 704/254
2016/0077574 A1* 3/2016 Bansal .................. G06F 1/3293 704/275
2016/0077792 A1 3/2016 Bansal et al.
2016/0358603 A1* 12/2016 Azam .................. G10L 15/26
2018/0210703 A1 7/2018 Meyers et al.
2018/0233150 A1* 8/2018 Gruenstein .................. G10L 15/32
2019/0385634 A1* 12/2019 Traynor .................. G10L 25/18
2020/0050427 A1* 2/2020 Althaus .................. G06F 3/167
2020/0058295 A1* 2/2020 Debnath .................. G10L 15/22
2020/0175985 A1* 6/2020 Lee .................. G10L 15/22
2020/0184959 A1 6/2020 Yasa et al.
2021/0092222 A1* 3/2021 Kang .................. H04M 3/42221
2021/0158803 A1* 5/2021 Knudson .................. G10L 15/22
2021/0366476 A1* 11/2021 Smith .................. G06F 3/167
2023/0059469 A1* 2/2023 Sharifi .................. G10L 15/08
2023/0323727 A1* 10/2023 Rosenthal .................. B60R 25/01 49/31

OTHER PUBLICATIONS

"Tips on designing conversations for voice interfaces" Kore, May 26, 2018.

International Search Report and Written Opinion relating to Application No. PCTUS2022073345, dated Oct. 27, 2022.

Office Action issued in related Japanese Patent Application No. 2024-502157, dated Feb. 25, 2025.

* cited by examiner

HOTWORDING BY DEGREE

CROSS REFERENCE TO RELATED APPLICATIONS

This U.S. patent application is a continuation of, and claims priority under 35 U.S.C. § 120 from, U.S. patent application Ser. No. 17/305,806, filed on Jul. 14, 2021. The disclosure of this prior application is considered part of the disclosure of this application and is hereby incorporated by reference in its entirety.

TECHNICAL FIELD

This disclosure relates to hotwording by degree.

BACKGROUND

A speech-enabled environment (e.g., home, workplace, school, automobile, etc.) allows a user to speak a query or a command out loud to a computer-based system that fields and answers the query and/or performs a function based on the command. The speech-enabled environment can be implemented using a network of connected microphone devices distributed through various rooms or areas of the environment. These devices may use hotwords to help discern when a given utterance is directed at the system, as opposed to an utterance that is directed to another individual present in the environment. Accordingly, the devices may operate in a sleep state or a hibernation state and wake-up only when a detected utterance includes a hotword. Once awake, the devices can proceed to perform more expensive processing such as full on-device automated speech recognition (ASR) or server-based ASR.

SUMMARY

One aspect of the disclosure provides a computer-implemented method for a soft acceptance of a hotword. The computer-implemented method when executed by data processing hardware causes the data processing hardware to perform operations. The operations include receiving audio data characterizing a soft hotword event detected by a hotword detector in streaming audio captured by a user device. The operations also include processing the audio data to determine that the audio data corresponds to a query specifying an action to perform on the user device. Without triggering performance of the action on the user device or another device, the operations include providing a notification for output from the user device where the notification prompts a user associated with the user device to provide an affirmative input indication in order to trigger performance of the action on the user device or the other device and, when the user fails to provide the affirmative input indication, instructing the user device or the other device to not perform the action specified by the query.

Another aspect of the disclosure provides a system for a soft acceptance of a hotword. The system includes data processing hardware and memory hardware in communication with the data processing hardware. The memory hardware stores instructions that when executed on data processing hardware cause the data processing hardware to perform operations. The operations include receiving audio data characterizing a soft hotword event detected by a hotword detector in streaming audio captured by a user device. The operations also include processing the audio data to determine that the audio data corresponds to a query specifying an action to perform on the user device. Without triggering performance of the action on the user device or another device, the operations include providing a notification for output from the user device where the notification prompts a user associated with the user device to provide an affirmative input indication in order to trigger performance of the action on the user device or the other device and, when the user fails to provide the affirmative input indication, instructing the user device or the other device to not perform the action specified by the query.

Implementations of the method or the system may include one or more of the following optional features. In some implementations, the hotword detector resides on the user device and is configured to detect the soft hotword event when a confidence score indicating a likelihood that the audio stream captured by the user device includes a presence of a hotword satisfies a first threshold score and dissatisfies a second threshold score. In some examples, the operations further include determining whether the affirmative input indication is received within a predetermined duration of time since providing the notification for output from the user device and determining that the user fails to provide the affirmative input indication when the affirmative input indication is not received within the predetermined duration of time. In some configurations, the operations include receiving a negative input indication indicating that the user does not want the user device or the other device to perform the action specified by the query and determining that the user fails to provide the affirmative input indication in response to receiving the negative input indication. Here, the notification provided for output from the user device also prompts the user to provide the negative input indication indicating that the user does not want the user device or the other device to perform the action specified by the query. In some implementations, providing the notification for output from the user device includes instructing a graphical user interface executing on the user device to render the notification as a visual notification for display on a screen of the user device. In these implementations, the operations further include instructing the graphical user interface to remove the visual notification displayed on the screen of the user device when the user fails to provide the affirmative input indication. Providing the notification for output from the user device may include instructing the user device to output the notification as an audible notification from a speaker of the user device.

The method or the system may also include operations that also receive the affirmative indication from the user and, in response to receiving the affirmative input indication, trigger performance of the action specified by the query on the user device or the other device. Receiving the affirmative input indication from the user may include receiving a speed input from the user and determining the speech input includes one or more terms characterizing an intent for the user device or the other device to perform the action specified by the query. In some examples, receiving the affirmative input indication from the user includes receiving a user input indication indicating selection of affirmative graphical element displayed on a screen of the user device.

Some configurations of the method or the system include operations that, after providing the notification for output from the user device, activate a warm model configured to detect, without performing speech recognition, a presence of at least one of one or more spoken terms characterizing the affirmative input indication or one or more other spoken terms characterizing a negative input indication where the negative input indication indicates that the user does not want the user device or the other device to perform the action specified by the query. In some examples, the operation may include, after providing the notification for output from the user device, instructing an automated speech recognizer in communication with the data processing hardware to operate with reduced functionality sufficient for recognizing at least one of one or more spoken terms characterizing the affirmative input indication or one or more other spoken terms characterizing a negative input indication where the negative input indication indicates that the user does not want the user device to perform the action specified by the query. Additionally or alternatively, the operations of the method or the system may further include, when the user fails to provide the affirmative input indication, deleting any storage of the received audio segment.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
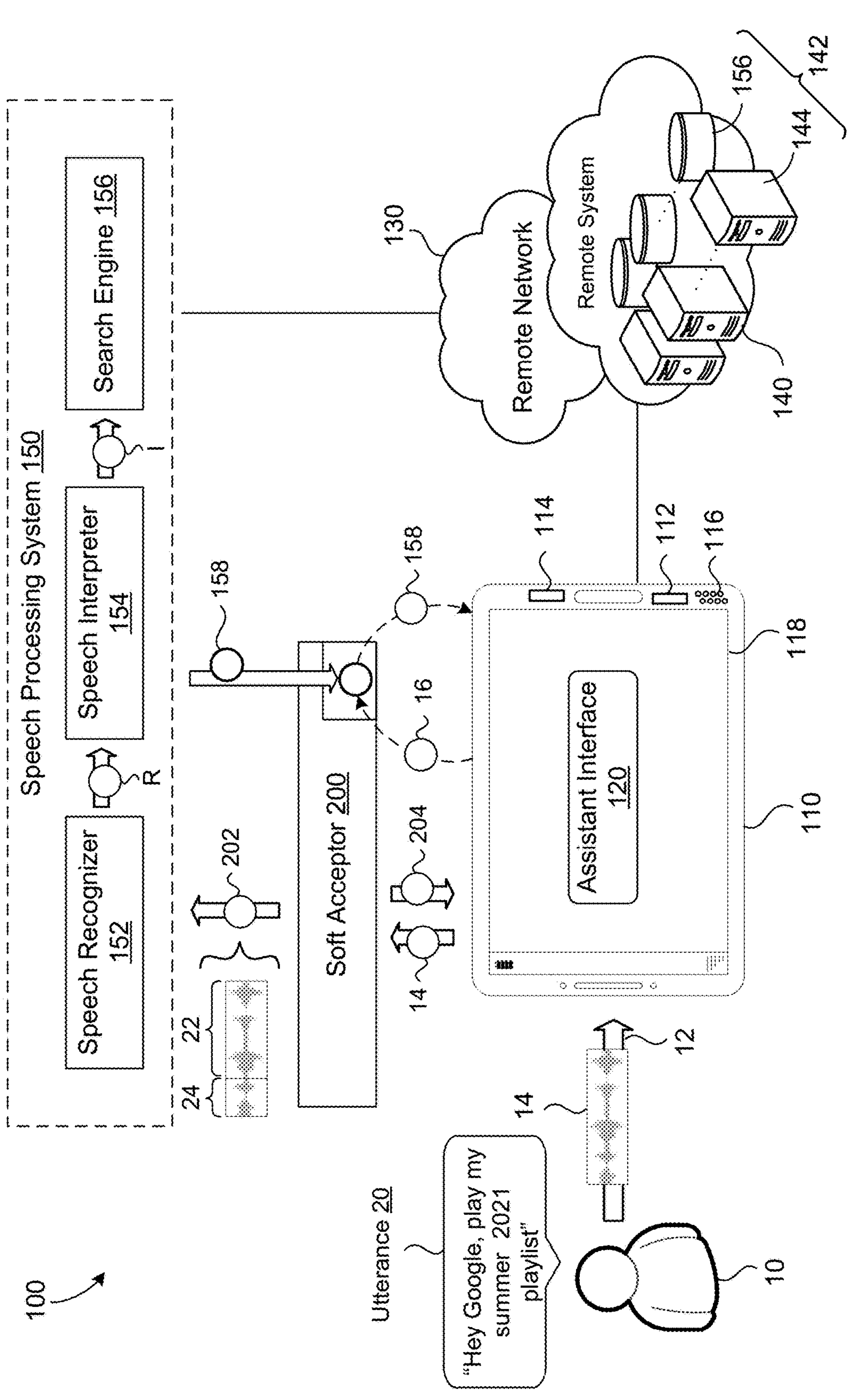
FIG. 1A is a schematic view of an example speech environment.

A voice-enabled device (e.g., a user device executing a voice assistant) allows a user to speak a query or a command out loud and field an answer for the query and/or perform a function based on the command. Through the use of a "hotword" (also referred to as a "keyword," "attention word," "wake-up phrase/word," "trigger phrase," "invocation phrase," or "voice action initiation command"), in which by agreement a predetermined term/phrase that is spoken to invoke attention for the voice-enabled device is reserved, the voice-enabled device is able to discern between utterances directed to the system (i.e., to initiate a wake-up process for processing one or more terms following the hotword in the utterance) and utterances directed to an individual in the environment. Typically, the voice-enabled device operates in a sleep state to conserve battery power and does not process input audio data unless the input audio data follows a spoken hotword. For instance, while in the sleep state, the voice-enabled device captures input audio via a microphone and uses a hotword detector trained to detect the presence of the hotword in the input audio. When the hotword is detected in the input audio, the voice-enabled device initiates a wake-up process for processing the hotword and/or any other terms in the input audio following the hotword.

Hotword detection is analogous to searching for a needle in a haystack because the hotword detector must continuously listen to streaming audio, and trigger correctly and instantly when the presence of the hotword is detected in the streaming audio. In other words, the hotword detector is tasked with ignoring streaming audio unless the presence of the hotword is detected. Neural networks are commonly employed by hotword detectors to address the complexity of detecting the presence of a hotword in a continuous stream of audio. A hotword detector typically includes components that convert raw audio signals captured by the microphone of the user device into one or more audio features formatted for processing by the neural network. The neural network is trained to recognize an audio sequence that includes the hotword.

With the increase in voice-enabled devices, generally there is a need for these devices to be effective at speech processing (e.g., speech recognition or text-to-speech). Since speech processing hinges on the ability of a hotword detector to reliably initiate speech processing when a hotword is detected, the decision of whether a hotword is detected in speech received at the hotword detector can impact a user's experience with the voice-enabled device. In other words, if the user speaks a hotword followed by a requested action for the voice-enabled device to perform (e.g., "Hey Google, play my summer 2021 playlist"), but the hotword detector fails to detect the presence of the hotword, speech processing will not occur to understand and to fulfill the requested action. This situation likely causes the user to repeat his or her spoken utterance and may result in a frustrated experience for the user. Due to this error, the user may lose trust in the voice-enabled device's capabilities. Unfortunately, without user trust, a voice-enabled device may become underutilized.

One current issue with hotword detection is that the process is typically binary. Meaning that, the hotword detector listens to an audio stream and either commits the audio stream to speech processing or does not commit the audio stream to speech processing. By either committing or not committing, the hotword detector is essentially conveying that it perceives that a hotword is present in the audio stream or that a hotword is not present in the audio stream. Yet in actuality, the hotword detector scores each sound bite or audio segment of an audio stream corresponding to a spoken utterance. Here, the score represents a probability or likelihood that a hotword is present in the audio data. This results in a confidence gradient with one end of the gradient being a highest confidence that a hotword is present in audio data and the other end being the lowest confidence that a hotword is present in the audio data. Currently, with a binary approach, the confidence gradient is divided into two outcome categories based on the confidence score, a first outcome of hotword accept or a second outcome of hotword reject.

Unfortunately, having only two possible hotword outcomes (e.g., an acceptance outcome and a rejection outcome) inherently causes a response that is not necessarily tailored to the degree of confidence as to whether audio data includes the presence of a hotword. That is, if the hotword detector scores an audio segment of audio data with a hotword detection score of 55% to represent a 55% confidence that the audio segment includes a hotword, the hotword system does not perform a subsequent action to reflect the 55% confidence. Rather, since 55% confidence indicates that the hotword detector is more confident that a hotword is present than not present, an audio segment with a 55% confidence in a binary approach is simply categorized or classified as a hotword accept. With a binary approach, confidence scores more towards the middle of the confidence gradient (e.g., 40-60% confidence) are sheparded into a response category that may poorly classify the actual confidence level. In other words, if the hotword system is 51% confident that a hotword was present in a particular audio segment, the hotword system may simply classify this confidence as an acceptance outcome in the same manner as another audio segment with a 99% confident that a hotword is present. Therefore, the inherent incongruence with a binary approach increases the likelihood that the hotword detector errs in accepting or rejecting an audio segment. Stated differently, a binary hotword detector lends itself to false accept (i.e., categorized as an acceptance outcome even though the hotword is not present) or false reject (i.e., categorized as a rejection outcome even though the hotword is present) errors.

In the binary approach, the hotword detector is configured with a threshold confidence that demarcates the acceptance outcome from the rejection outcome. For instance, the threshold confidence may be set to 50% confidence such that any audio segment with greater than 50% confidence is accepted and any audio segment with less than 50% confidence is rejected. In some examples, the threshold is acceptance inclusive meaning that an audio segment with exactly 50% confidence is accepted. In other examples, the threshold is instead rejection inclusive meaning that an audio segment with exactly 50% confidence is rejected. Often, the threshold confidence for a binary hotword detector attempts to balance the error on both sides. In other words, set the threshold confidence to a confidence that minimizes the number of false accepts and false rejects. Since the threshold is tuned to minimize errors (i.e., false accepts and false rejects), moving the threshold confidence in either direction fails to decrease the percentage of errors. That is, moving the threshold from a 50% confidence to a 55% confidence may result in less errors from false accepts, but more errors from false rejects. On the other hand, moving the threshold from a 50% confidence to a 45% confidence may result in less errors from false rejects, but more errors from false accepts.

Since moving the threshold confidence simply trades off errors instead of reducing the overall number of errors, there is a need for an approach that accounts for borderline confidence cases. To address some of these issues, the approach described herein is a non-binary approach that introduces an outcome category referred to as a soft accept. This outcome category may be in addition to the outcome categories of accept and reject. A soft accept refers to an outcome where the hotword detector accepts that an audio segment includes the presence of a hotword on the condition that a response (e.g., a response action) to a request or query included in the audio stream is at least initially limited. For instance, a soft accept requires that an action fulfilling to a query (i.e., a request or command) cannot be performed until the action is affirmatively acknowledged. When the action is affirmatively acknowledged, the action is subsequently executed.

Generally when a hotword detector of a speech processing system accepts that a hotword is present in an audio stream, the hotword detector commits the audio stream for full speech processing. The full speech processing determines whether the audio stream requests a particular response (e.g., a response action) from the voice-enabled device. When the audio stream requests a particular response, the systems of the voice-enabled device are typically configured to automatically process and/or perform the response. For instance, if the user speaks a hotword of "Hey Google" followed by the requested action of "play my summer 2021 playlist," (i.e., an utterance of "Hey Google, play my summer 2021 playlist" as shown in FIG. 1A), the voice-enabled device recognizes the hotword (e.g., with the hotword detector), opens a music playing application that includes the "summer 2021 playlist," and plays the "summer 2021 playlist" using the music playing application (e.g., Google Play Music). In contrast, with a soft accept, the user may not have spoken the hotword, "Hey Google" very clearly. This lack of clarity may result in the hotword detector indicating that an audio segment corresponding to "Hey Google" has a hotword confidence corresponding to the soft accept outcome category. With a soft accept outcome category, the hotword detector also commits the audio of "play my summer 2021 playlist" to full speech processing. In this soft accept example, instead of generating (e.g., automatically generating) the response of playing the "summer 2021 playlist," the system responds with a limited response (or soft answer). For instance, the limited response is a response that notifies the user via the voice-enabled device of the system's interpreted response for the utterance. In some examples, this soft answer is a notification that requests user-permission to proceed with the system's interpreted response. For example, the system generates a visual response (e.g., a prompt) on the voice-enabled device that states, "would you like to play your summer 2021 playlist on Google Play Music?" Here, the system does not generate the interpreted response (i.e., to play the summer 2021 playlist on Google Play Music) until the user grants permission for the interpreted response (e.g., performing an interaction that affirmatively acknowledges the visual response).

By constraining the initial response by the system to a limited response (e.g., requesting affirmative acknowledgement of an action from a query before performing the action), the soft accept outcome hedges such that a lower hotword confidence results in a limited response that is likely to be less obtrusive to a user than an incorrect full response. In this sense, the system is generating a response that reflects the hotword confidence. In the example of "Hey Google, play my summer 2021 playlist," the user may have actually uttered "I should add, 'hey beautiful' to my summer 2021 playlist," while speaking to someone else in audible range of the voice-enabled device (i.e., the utterance was actually side speech rather than follow-on speech). An incorrect interpretation by the system of "Hey Google, play my summer 2021 playlist," may result in a rather intrusive response to the user. In other words, the voice-enabled device may suddenly start playing music from the playlist over the conversation the user is having (e.g., as shown in FIG. 1). However, if the actual utterance of "I should add, 'hey beautiful' to my summer 2021 playlist," had a hotword confidence resulting in a soft accept outcome, the result may be simply that the voice-enabled device generates a unobtrusive prompt on a display of the voice-enabled device that states "Do you want to play your summer 2021 playlist?" to which the user may ignore or perform an interaction that negatively acknowledges the prompt (e.g., as shown in FIG. 1C).

In some examples, the limited response is a visual response even though the interpreted full response (i.e., the action requested by a query) is an audible response. This follows the principle that there is often an asymmetry between a visual response and an audible response. Generally, a visual response is only disruptive if a user is looking at the display displaying the visual response whereas an audible response is disruptive when the user can hear the audible response. Meaning that, an audible response can be naturally more disruptive than a visual response due to human sensory perception. In other words, many users have a greater sensory area for hearing something than the sensory area for seeing something (i.e., in earshot, but not in the field of view). Therefore, visual responses such as a notification or a small pop-up window may be less intrusive responses when compared to changing an entire window for the voice-enabled device or audibly asking the user if they want to "play the summer 2021 playlist."

The soft accept outcome may also function as feedback to the speech processing system associated with the voice-enabled device. For instance, since the limited response may prompt the user for permission as to whether to proceed with generating a response to a request or query, the user's grant of permission or denial of permission may provide meaningful feedback for the hotword detector. That is, the user's interaction with the limited response indicates that the hotword was present or not present. Stated differently, the user of the voice-enabled device is unlikely to grant permission to generate a response that he or she did not solicit in the first place. In this respect, if the user does grant permission to generate the response, the interaction to grant permission may be interpreted by the system as a positive hotword example. The system may then store the positive hotword example to function as a future training example for a model (e.g., a machine learning model) being used by the hotword detector to predict the probability that a hotword exists in audio data input to the hotword detector. In this sense, the user's interaction may label the hotword example as a positive hotword example to generate supervised hotword training examples for the hotword detector (e.g., to improve or updated the functionality of the hotword detector). In some examples, these positive hotword examples do not function as hotword training examples for the hotword detector in the broad sense, but rather function to train the hotword detector to perform more accurate soft acceptance (i.e., function as soft acceptance training examples).

Additionally or alternatively, the soft accept output may be feedback to assist the user device in fine-tuning a hotword sensitivity associated with the hotword detector. For instance, the hotword detector can evaluate the frequency of soft accept outcomes in comparison to how many of those soft accept outcomes were identified as legitimate queries and furthermore how many of the legitimate queries resulted in affirmative acknowledgement by a user. Meaning that, if a speech processing system was failing to identify a query associated with a soft accept outcome at a certain percentage (e.g., a threshold percentage), the hotword detector may be configured to change its soft acceptance confidence thresholds to minimize or to reduce that percentage. In other words, the soft accept outcome appears to be occurring when a query is not present in the audio data that includes a soft hotword. In this situation, it is likely that a hotword was not present in the audio data either because the user initiates a query with a hotword as an invocation phrase for a query. Without a query, it is unlikely that a hotword was present and therefore this situation can serve as feedback to teach the hotword detector that the soft accept outcome is over inclusive (i.e., including false accepts). In a similar respect, if a user does not affirmatively acknowledge a query corresponding to a soft accept outcome (or performs negative acknowledgement), this situation may represent that the user device picked up side speech rather than speech actually directed to the user device. Accordingly, the hotword detector may adjust one or more of its confidence thresholds corresponding to a soft accept outcome based on the frequency of occurrence of a lack of affirmative acknowledgement for an action stemming from a soft accept outcome.

Referring to FIGS. 1A-1D, in some examples, a speech environment 100 includes a user 10 speaking an utterance 20 within an audible range of a voice-enabled device 110 (also referred to as a device 110 or a user device 110) executing a digital assistant interface 120. Here, the utterance 20 spoken by the user 10 may be captured by the device 110 in the streaming audio 12 and may correspond to a query 22 to perform an action, or more specifically, a query 22 for the digital assistant interface 120 to perform the action. The user 10 may prefix the query 22 with a hotword 24 (e.g., invocation phrase) to trigger the device 110 from a sleep or hibernation state when a hotword 24 is detected in the streaming audio 12 by a hotword detector (e.g., the soft acceptor 200) running on the device 110 while in the sleep or hibernation state. The action may also be referred to as an operation or task. In this sense, the user 10 may have conversational interactions with the digital assistant interface 120 executing on the voice-enabled device 110 to perform computing activities or to find answers to questions.

The device 110 may correspond any computing device associated with the user 10 and capable of capturing audio from the environment 100. In some examples, user devices 110 include, but are not limited to, mobile devices (e.g., mobile phones, tablets, laptops, e-book readers, etc.), computers, wearable devices (e.g., smart watches), music players, casting devices, smart appliances (e.g., smart televisions) and internet of things (IoT) devices, remote controls, smart speakers, etc. The device 110 includes data processing hardware 112 and memory hardware 114 in communication with the data processing hardware 112 and storing instructions, that when executed by the data processing hardware 112, cause the data processing hardware 112 to perform one or more operations related to speech processing.

The device 110 further includes an audio subsystem 116 with an audio capturing device (e.g., an array of one or more microphones) for capturing and converting audio within the speech environment 100 into electronic signals (e.g., audio data 14). While the device 110 implements the audio capturing device 116 (also referred to generally as a microphone 116) in the example shown, the audio capturing device 116 may not physically reside on the device 110, but be in communication with the audio subsystem (e.g., peripherals of the device 110). For example, the device 110 may correspond to a vehicle infotainment system that leverages an array of microphones positioned throughout the vehicle. In another example, the audio capturing device **116*a* may reside on another device in communication with the user device 110 that is to perform the action. Additionally, the audio subsystem 116 may include a playback device (e.g., such as one or more speakers) for playing back audio generated by the user device 110** (e.g., synthetic audio or synthetic speech).

The device 110 may also include a display 118 to display graphical user interface (GUI) elements (e.g., windows, screens, icons, menus, etc.) and/or graphical content. For example, the device 110 may load or launch applications (local or remote applications) that generate GUI elements or other graphical content for the display 118. Moreover, the elements generated in the display 118 may be selectable by the user 10 and also serve to provide some form of visual feedback to processing activities and/or operations occurring on the device 110. Furthermore, since the device 110 is a voice-enabled device 110, the user 10 may interact with elements generated on the display 118 using various voice commands. For instance, the display 118 may depict a menu of options for a particular application and the user 10 may use the interface 120 to select an option through speech.

The speech-enabled interface (e.g., a digital assistant interface) 120 may field the query 22 or the command conveyed in the spoken utterance 20 captured by the device 110. The speech-enabled interface 120 (also referred to as interface 120 or an assistant interface 120) generally facilitates receiving audio data 14 corresponding to an utterance 20 and coordinating speech processing on the audio data 14 or other activities stemming from the utterance 20. The interface 120 may execute on the data processing hardware 112 of the device 110. The interface 120 may channel audio data 14 that includes an utterance 20 to various systems related to speech processing or query fulfillment.

Furthermore, the device 110 is configured to communicate via a network 130 with a remote system 140. The remote system 140 may include scalable remote resources 142, such as remote data processing hardware 144 (e.g., remote servers or CPUs) and/or remote memory hardware 146 (e.g., remote databases or other storage hardware). The device 110 may utilize the remote resources 142 to perform various functionality related to speech processing (e.g., by the speech processing system 150) and/or soft acceptance (e.g., by the soft acceptor 200). For instance, the device 110 is configured to perform speech recognition using a speech recognition system 152 and/or speech interpretation using a speech interpreter 154. In some examples, although not shown, the device 110 may additionally convert text-to-speech (TTS) during speech processing using a TTS system.

Systems 150, 200 may reside on the device 110 (referred to as on-device systems) or reside remotely (e.g., reside on the remote system 140), but in communication with the device 110. In some examples, some of these systems 150, 200 reside locally or on-device while others reside remotely. In other words, any of these systems 150, 200 may be local or remote in any combination. For instance, when a system 150, 200 is rather large in size or processing requirements, the system 150, 200 may reside in the remote system 140. Yet when the device 110 may support the size or the processing requirements of one or more systems 150, 200, the one or more systems 150, 200 may reside on the device 110 using the data processing hardware 112 and/or the memory hardware 114. Optionally, the one or more of the systems 150, 200 may reside on both locally/on-device and remotely. For instance, one or more of the systems 150, 200 may default to execute on the remote system 140 when a connection to the network 130 between the device 110 and remote system 140 is available, but when the connection is lost or the network 130 is unavailable, the systems 150, 200 instead execute locally on the device 110.

The device 110 is also configured to communicate with the speech processing system 150. The speech processing system 150 is generally able to perform various functionality related to speech processing such as speech recognition and speech interpretation (also known as query interpretation). For instance, the speech processing system 150 of FIG. 1A is shown to include a speech recognizer 152 that performs automated speech recognition (ASR), a speech interpreter 154 that determines the meaning of the recognized speech (i.e., to understand the speech), and a search engine 156 to retrieve any search results in response to a query identified in the recognized speech. When the soft acceptor 200 detects a soft hotword event 202, the soft acceptor 200 passes the audio data 14 to the speech processing system 150. The soft hotword event 202 indicates that the soft acceptor 200 accepts a portion of the audio data 14 (e.g., the first audio segment) as a hotword 24. With a portion of the audio data 14 identified as a hotword 24, the soft acceptor 200 communicates the audio data 14 as a soft hotword event 202 such that the speech processing system 150 can perform speech processing over the audio data 14. By performing speech processing over the audio data 14, the speech recognizer 152 in combination with the speech interpreter 154 is able to determine whether a second audio segment (e.g., shown as the query 22) of the audio data 14 is indicative of a spoken query-type utterance.

A speech recognizer 152 receives audio data 14 corresponding a soft hotword event 202 as input and transcribes the audio data 41 into a transcription as an output referred to as a speech recognition result R. Generally speaking, by converting audio data 14 into a transcription, the speech recognizer 152 allows the device 110 to recognize when a spoken utterance 20 from the user 10 corresponds to a query 22 (or command), or some other form of audio communication. The transcription refers to a sequence of text that the device 110 (e.g., the assistant interface 120 or the speech processing system 150) may then use to generate a response to the query or the command. The speech recognizer 152 and/or the interface 120 may provide the speech recognition result R to the speech interpreter 154 (e.g., a natural language understand (NLU) module) to perform semantic interpretation on the result R to determine whether the audio data 14 includes a query 22 requesting a particular action 148 to be performed. In other words, the speech interpreter 154 generates an interpretation I of the result R in order to identify the query 22 or command in the audio data 14 and to allow the speech processing system 150 to respond to the query 22 with a corresponding action 158 invoked by the query 22. For instance, if the query 22 is a command to play music, the corresponding action 158 invoked by the query 22 is to play the music (e.g., by executing an application that is capable of playing music). In some examples, the speech processing system 150 employs a search engine 156 to retrieve search results that enable the speech processing system 150 to respond to the query 22 (i.e., fulfill the query 22).

The soft acceptor 200 generally functions as a type of hotword detector. That is, the soft acceptor 200 is configured to detect the presence of a hotword 24 in streaming audio 12. The soft acceptor 200 may be configured to be "always-on" to detect the presence of the hotword. The soft acceptor 200 may include a hotword detection model, such as a neural network-based model, configured to detect acoustic features indicative of the hotword 24 without performing speech recognition or semantic analysis. By using a soft acceptor 200, detection of the hotword 24 may occur at low powered hardware, such as a digital signal processor (DSP) chip, which avoids consuming a device's computing processing units (CPUs) (e.g., associated with the data processing hardware 112). In some examples, the functionality of the soft acceptor 200 may be divided into one or more stages of hotword detection. For instance, a first stage to initially detect a candidate hotword and a second stage to confirm the candidate hotword as a hotword. Even with multiple stages, when the detector detects a hotword 24, the hotword 24 may trigger the device to wake-up and initiate speech recognition that demands more expensive processing (e.g., ASR and natural language understanding (NLU)). Here, the device may perform on-device ASR by executing the speech recognizer 152 on the data processing hardware 112 (e.g., CPU). Optionally, the device 110 may establish a network connection with a server (e.g., remote system 140 of FIG. 1A) and provide the audio data 14 to the server to perform server-side ASR and/or NLU on the audio data 14.

Yet the soft acceptor 200 differs from conventional hotword detectors in that the soft acceptor 200 may categorize a hotword detection outcome as a soft accept outcome or, more particularly, as a soft hotword event 202. Here, a soft hotword event 202 refers to a situation where the soft acceptor 200 determines that the audio data 14 includes a hotword 24, but the confidence of the hotword detection causes the soft acceptor 200 to designate the hotword detection not as a full accept, but as a soft accept. With either the full accept or the soft accept, the soft acceptor 200 passes the audio data 14 from the streaming audio 12 to the speech processing system 150 for the system 150 to process in order to determine whether the audio data 14 corresponds to a query 22 specifying an action 148 to perform on the device 110. The difference between a full accept and a soft accept is that the device 110 is typically permitted to perform an action 148 specified by a query 22 associated with a fully accepted hotword (e.g., automatically perform the action) whereas, with a soft accept, the device 110 cannot perform the action 148 specified by a query 22 associated with the soft accept until the soft acceptor 200 generates a notification 204 that prompts the user 10 associated with the device 110 to provide an affirmative input indication 16 (i.e., affirmatively acknowledge the notification 204) in order trigger performance of the action 148 on the device 110. Therefore, with a soft hotword event 202, if the user 10 fails to provide the affirmative input indication 16, the action 148 does not occur.

Figure 1B:
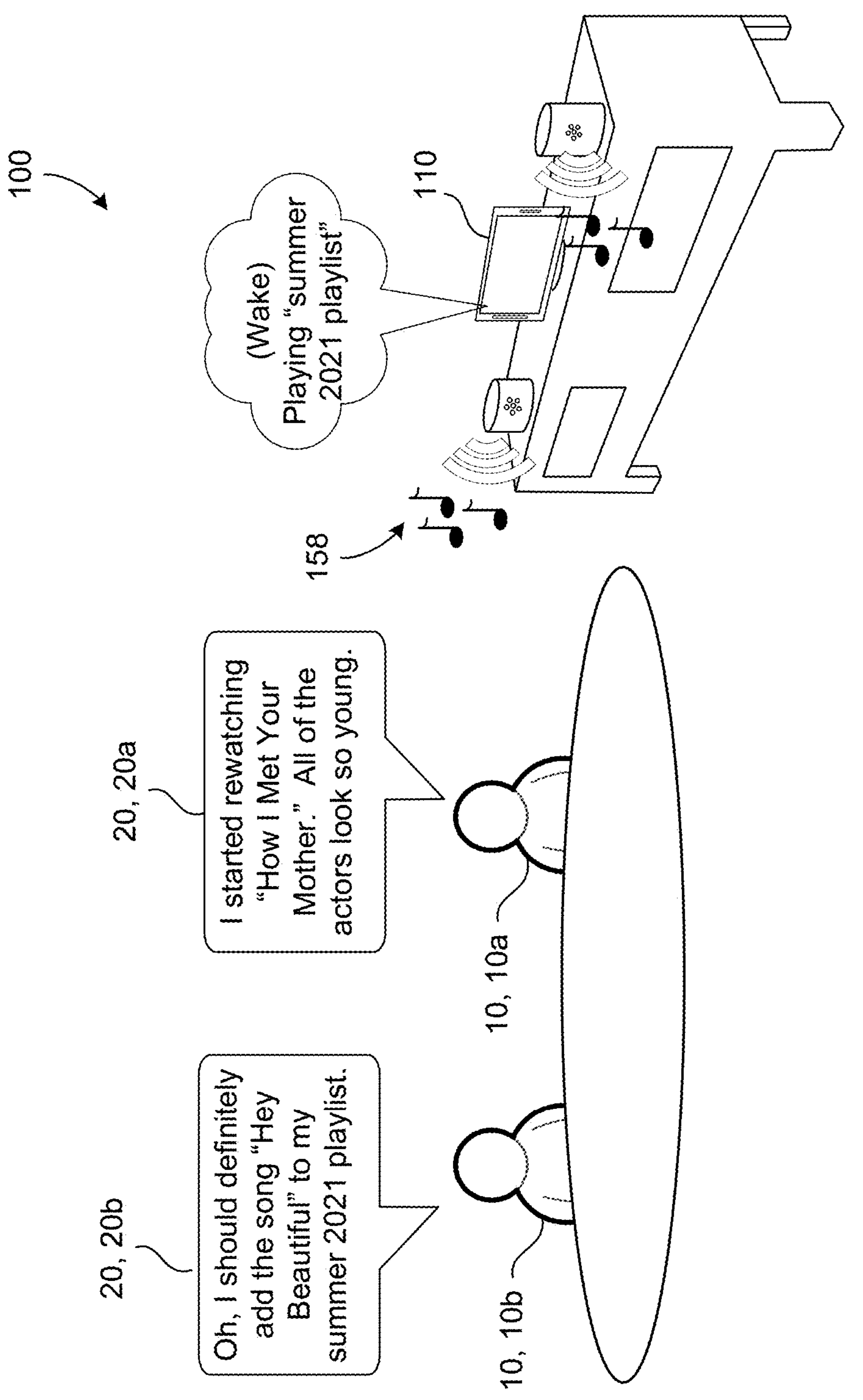
FIGS. 1B-ID are perspective views of example speech environments.
Figure 1C:
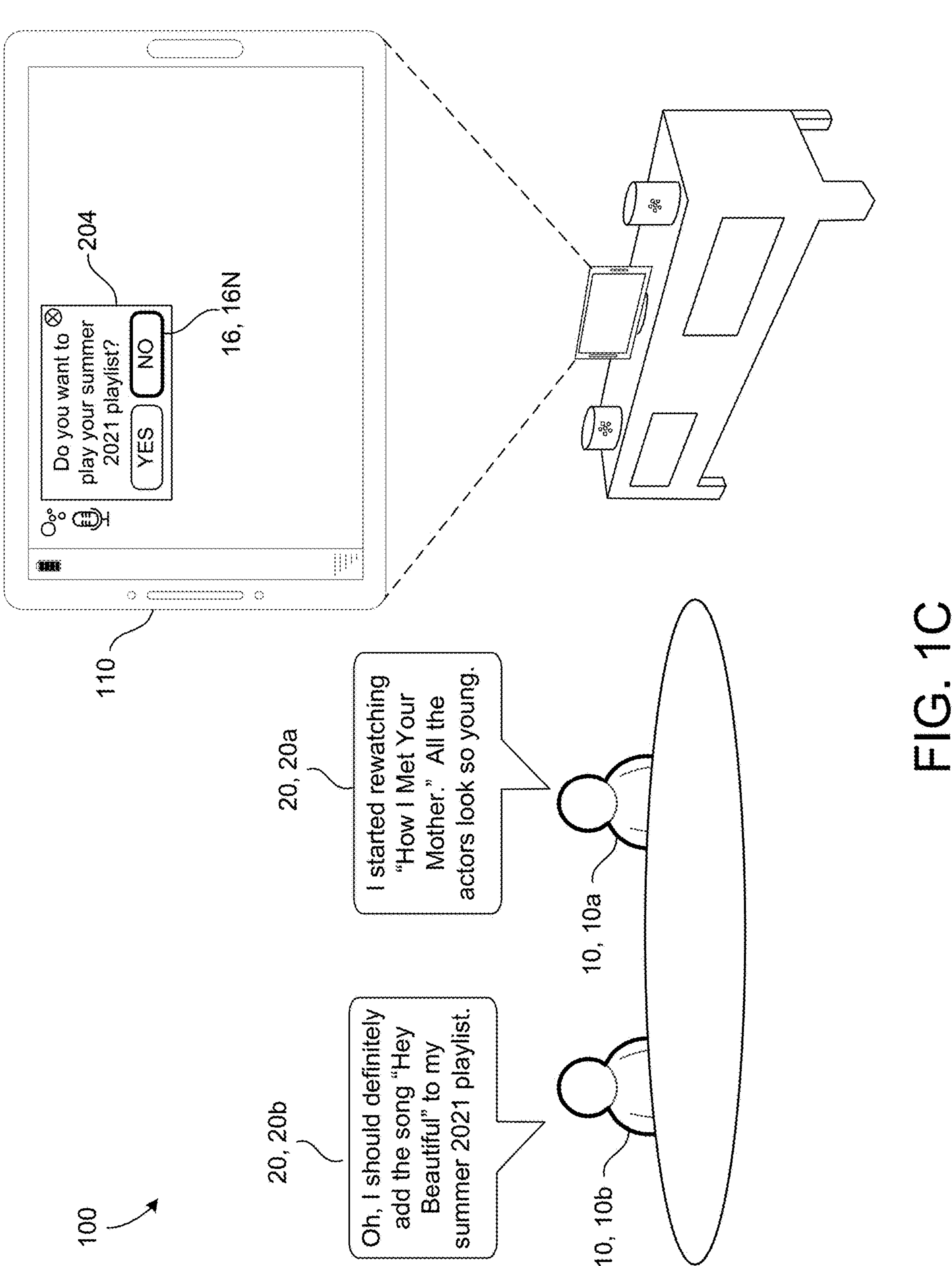
Figure 1D:
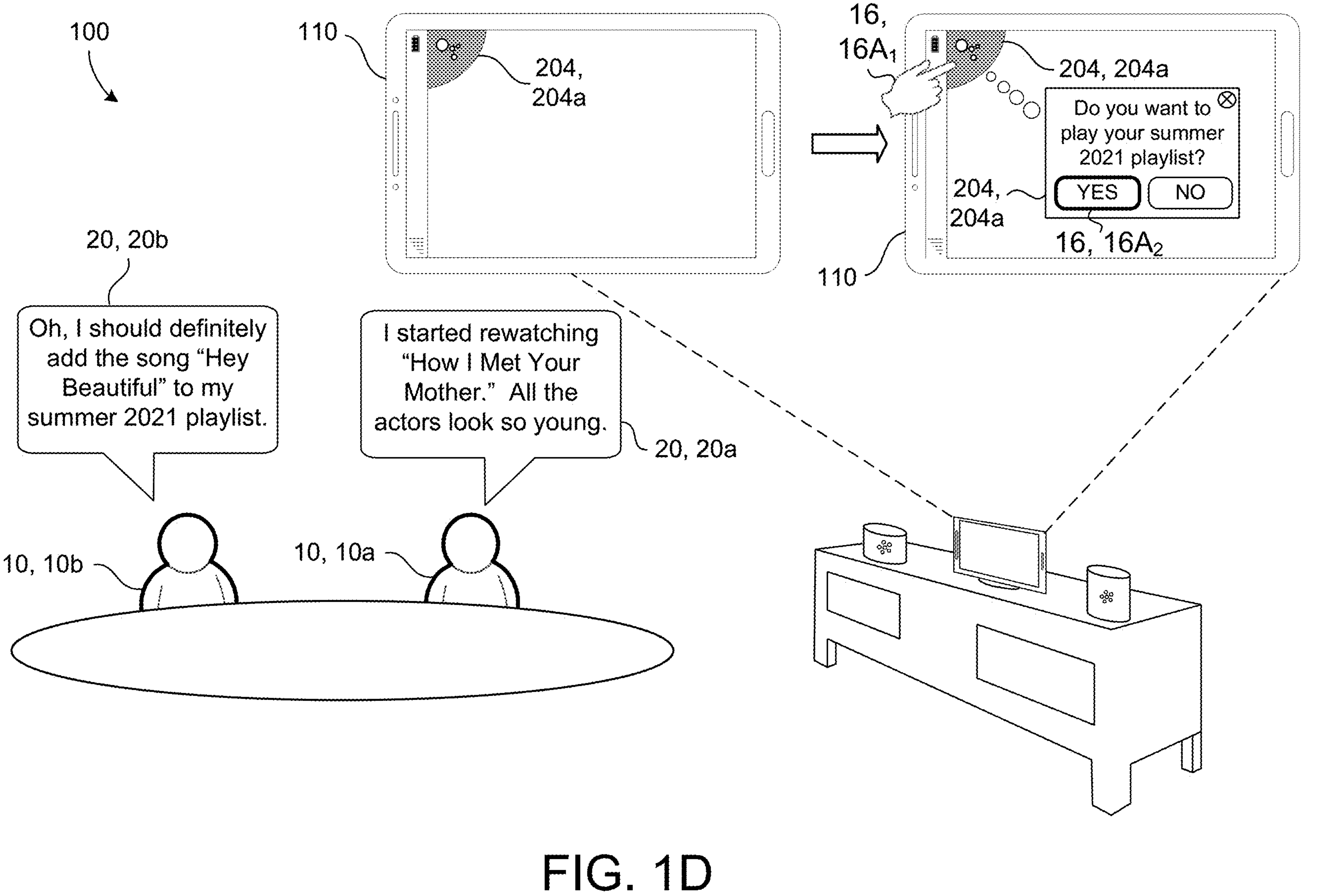

FIGS. 1B-1D illustrate some differences between conventional hotword detection (e.g., FIG. 1B) and hotword detection using the soft acceptor 200 (e.g., FIGS. 1C and 1D). In FIG. 1B, a first user 10, 10*a* is having a conversation with a second user 10, 10*b* while both users 10 sit at a table. A user device 110 currently resides on a sideboard within audible range of the conversation between the users 10. During the conversation, the first user 10*a* speaks a first utterance 20, 20*a* stating "I started rewatching 'How I Met Your Mother.' All of the actors look so young." In response to this statement from the first user 10*a*, the second user 10*b* speaks a second utterance 20, 20*b* stating "Oh I should definitely add the song 'Hey Beautiful' to my summer 2021 playlist." By mentioning the show "How I Met Your Mother," the first user 10*a* reminds the second user 10*b* that the second user $\mathbf{10}_b$ should add the "How I Met Your Mother" theme song to her summer 2021 playlist. Unfortunately in this scenario, a hotword detector associated with the user device 110 mistakes the term "Hey Beautiful" as the hotword "Hey Google." Because the hotword detector of the device 110 in FIG. 1B is only a binary hotword detector without a soft accept, once a hotword is detected, speech processing systems of the device 110 will automatically perform an action 148 associated with the detected hotword. Here, the device 110 interprets the action 148 to be that the device 110 should play the "summer 2021 playlist." The speakers paired with the device 110 then start playing the music from the "summer 2021 playlist." Unfortunately, neither the first user 10*a* nor the second user 10*b* wanted to hear any music and now their conversation is competing with unwanted music.

In contrast, FIGS. 1C and 1D depict the users 10*a-b* having the same conversation, but instead of the device 110 automatically performing the action 148 (i.e., playing music), the device 110 displays a notification 204 that asks if the action 148 should occur—"Do you want to play your 'summer 2021 playlist?" Since the user 10 did not request the playlist, the users 10 may ignore the notification 204 on the device 110 or provide the user device 110 with an input 16 that indicates that the action 148 is not wanted (i.e., a negative input). In some examples, when the notification 204 is ignored, the notification 204 will be automatically removed from the display 118 of the device 110 after a particular amount of time. That is, the device 110 gives a user 10 a finite time window to affirmatively acknowledge (i.e., accept or grant permission) the notification 204 in order to perform the action 148. Otherwise, without any acknowledgement, the action 148 may be forgotten (e.g., removed from memory). In this sense, when the users 10*a-b* are immersed in their own conversation and did not mean to generate an action 148, the device 110 generates an unobtrusive notification 204 that is not disruptive and disappears when the time window expires. In some examples, the time window may be dynamic such that the time window is extended or shortened depending on a current state of the user. For example, when the device 110 senses that the user 10 is approaching the device 110 to affirmatively acknowledge the notification 204, the device 110 may extend the time window.

FIG. 1D illustrates that a graphical size of the notification 204 may vary. For instance, the size of the notification 204 may be proportional to the hotword confidence determined by the soft acceptor 200. For example, a number of pixels that the notification 204 occupies may be proportional to the hotword confidence. In FIG. 1D, a first notification 204, 204*a* for the action 148 is rather small and is shown to simply function as a way to visually identify that a potential action 148 is on standby. In some implementations, the user 10 may select a notification 204 causing the notification 204 to change (e.g., enlarge or develop interactable icons/buttons). For example, in FIG. 1D, the first notification 204, 204*a* is a small corner graphical user interface (GUI) element. In this example, the user 10 selects (e.g., represented by the hand icon) the small corner GUI element to cause the device 110 to display a second notification 204, 204*b* that is a pop-up window with a prompt asking whether the user 10 wants the user device 110 to "play the summer 2021 playlist." Here, if a second user input 16, $\mathbf{16}A_2$ selects the "YES" icon within the second notification 204, 204*b*, the device 110 will then execute the action 148 in response to the user selection input 16.

Figure 2:
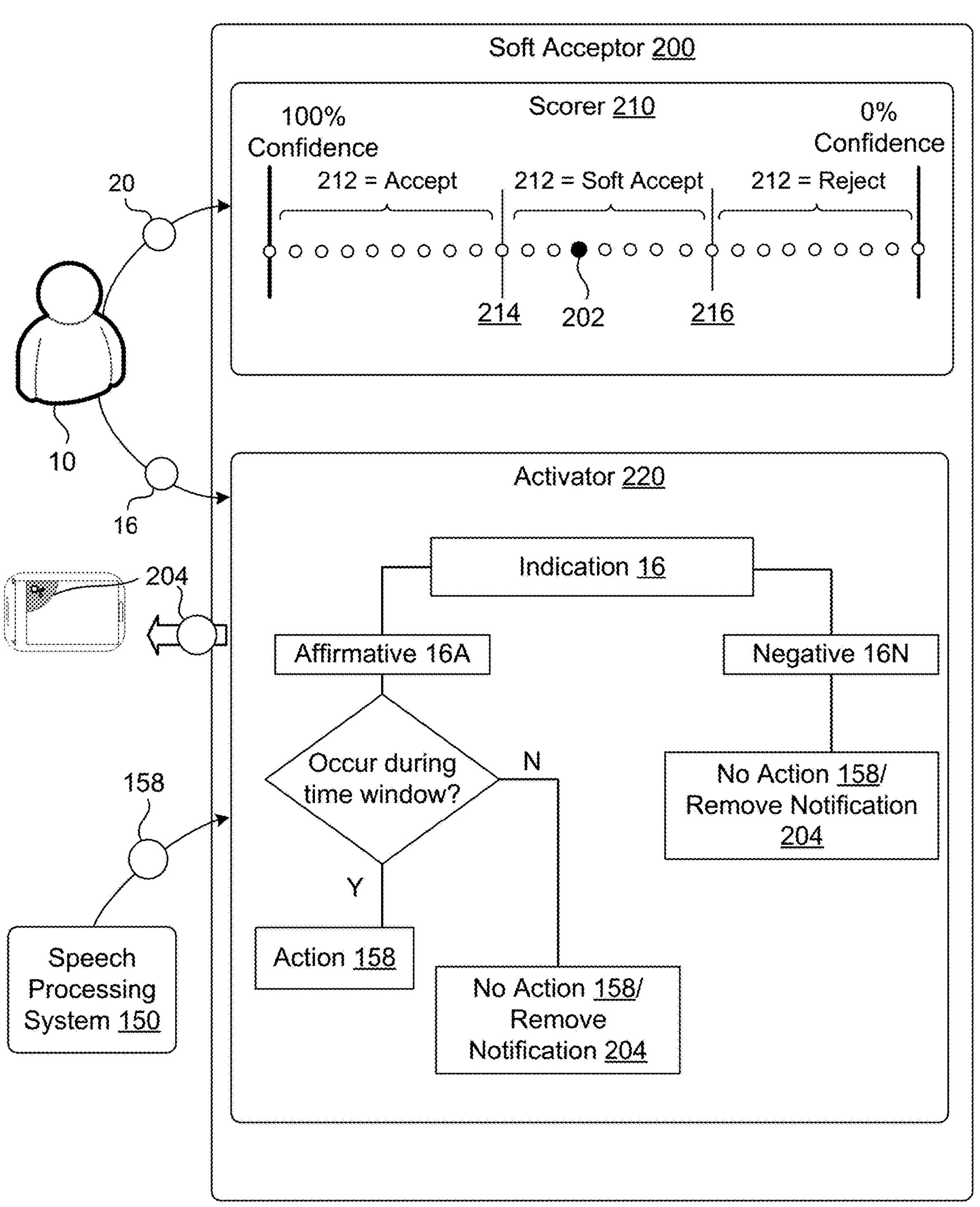
FIG. 2 is a schematic view of an example soft acceptor of FIG. 1A.

Referring to FIG. 2, in some implementations, the soft acceptor 200 includes a scorer 210 and an activator 220. When the soft acceptor 200 receives audio data 14 corresponding to an utterance 20, the scorer 210 is configured to generate a confidence score 212 for a portion of the audio data 14 (e.g., a first audio segment of the audio data 14). The confidence score 212 indicates a likelihood that the audio data 14 includes the presence of a hotword 24. In some examples, the scorer 210 corresponds to a hotword detector model (e.g., a neural network) that has been trained to receive audio data 14 as input and to generate, as output, a probability that predicts whether a portion of the audio data 14 includes a hotword 24. This means, as shown in FIG. 2, that an individual confidence score 212 exists along a confidence gradient ranging from 100% confidence that the audio data 14 includes a hotword 24 to a 0% confidence that the audio data 14 includes a hotword 24. The scorer 210 may then divide this gradient into different outcome categories. For instance, FIG. 2 depicts the confidence gradient of the scorer 210 with three outcome categories—an accept, a soft accept, and a reject. Here, each of these outcome categories are divided by a confidence threshold 214, 216. The confidence threshold 214, 216 refers to a confidence score 212 that delineates one outcome category from another outcome category. The first confidence threshold 214 refers to a confidence score 212 that delineates when the scorer 210 accepts that a hotword 24 is present in the audio data 14 and when the scorer 210 soft accepts that a hotword 24 is present in the audio data 14. For instance, if a confidence score 212 for an audio segment of the audio data 14 is greater than the first confidence threshold 214, the scorer 210 passes the audio data 14 to the speech processing system 150 to determine whether the audio data 14 corresponds to a query 22 specifying an action 148 to perform on the user device 110. If the audio data 14 corresponds to a query 22 specifying the action 148, the soft acceptor 200 allows the action 148 to be automatically performed since the confidence score 212 was greater than the first confidence threshold 214 and in a range of confidence scores 212 that correspond to the accept outcome category.

On the other hand, the second confidence threshold 216 refers to a confidence score 212 that delineates when the scorer 210 rejects that a hotword 24 is present in the audio data 14 and when the scorer 210 soft accepts that a hotword 24 is present in the audio data 14. For example, if the confidence score 212 for an audio segment of audio data 14 is less than the second confidence threshold 216, the scorer 210 does not pass the audio data 14 to the speech processing system 150 because the scorer 210 interprets this confidence score 212 as a reject outcome category; meaning that, the audio data 14 is unlikely to include the presence of a hotword 24. The first confidence threshold 214 and the second confidence threshold 216 therefore serve as the upper and lower bounds to a confidence score range that defines the soft accept outcome category. In other words, when the scorer 210 determines that the confidence score 212 is between the first confidence threshold 214 and the second confidence threshold 21, the scorer 210 determines that the audio data 14 characterizes a soft hotword event 202. The scorer 210 determines that a confidence score 212 corresponds to a soft hotword event 202 when the confidence score 212 satisfies the second confidence threshold 216 (e.g., exceeds the second confidence threshold 216) and dissatisfies the first confidence threshold 214 (e.g., fails to exceed the first confidence threshold 214) With a soft confidence event 202, just like an accept outcome category, the scorer 210 then passes the audio data 14 to the speech processing system 150 to determine whether the audio data 14 corresponds to a query 22 specifying an action 148 to perform on the user device 10.

Optionally, the first confidence threshold 214 and the second confidence threshold 216 may be dynamic in nature. For instance, the scorer 210 adjusts these confidence thresholds 214, 216 based on current acoustics in the vicinity adjacent the device 110. To illustrate, the user 10 may be hosting a large cocktail party. Normally, the first and second confidence thresholds 214, 216 that dictate the boundaries of the soft accept outcome are user defined, administrator defined, or feedback defined. In the situation of a large cocktail party with loud background noise, there may be an increased amount of ambient noise that distorts an intended hotword 24 and query 22 or there may be an increased amount of conversations that cause a soft hotword event 202 without a corresponding query 22. Due to this situation, the soft acceptor 200 may be configured to dynamically adjust the confidence thresholds 214, 216 to account for the background acoustics. For example, the first confidence threshold 214 and the second confidence threshold 216 are increased to result in a larger reject outcome range.

In some examples, even though the soft acceptor 200 passes the audio data 14 to the speech processing system 150 indicating that the audio data 14 includes the presence of a hotword 24, the speech processing system 150 (e.g., the speech interpreter 154) may nonetheless determine that a query 22 does not exist in the audio data 14. For instance, opposite of what is shown in FIGS. 1B-1D, the speech processing system 150 may determine that the utterance 20 "I should definitely add the song 'Hey Beautiful' to my summer 2021 playlist" does not include an action 148. In this circumstance, since the speech processing system 150 does not identify an action 148, the soft acceptor 200 accordingly does not generate a notification 204. Generally speaking, the soft acceptor 200 may prefer to have a soft hotword event 202 when the audio data 14 corresponds to an action 148. With this in mind, a soft acceptor 200 may collect occurrences when it designates a soft hotword event 202, but the speech processing system 150 fails to identify an action 148 corresponding to the soft hotword event 202. The collected occurrences may then be provided to the soft acceptor 200 as feedback. For example, each occurrence becomes a training example to update the hotword detection model. In some configurations, training the hotword detection model with the training examples adjusts one or more of the first confidence threshold 214 or the second confidence threshold 216. By adjusting these thresholds 214, 216, the soft acceptor 200 may be configured to limit or to reduce the range of confidence scores 212 that correspond to the soft accept outcome category.

When the speech processing system 150 determines that the audio data 14 corresponds to a query 22 specifying an action 148 to perform on the user device 110, the speech processing system 150 communicates the action 148 to the activator 220 of the soft acceptor 200. Upon receipt of the action 148, the activator 220 does not trigger performance of the action 148, but rather generates a notification 204 for the user 10 of the user device 110. The notification 204 prompts the user 10 to provide some user input indication 16 in order to trigger performance of the action 148 or to prevent performance of the action 148. The notification 204 may occur in different forms. In some implementations, the notification 204 is a visual notification displayed on the display 118 of the user device 110. In some examples, the notification 204 is a user prompt with GUI elements that permit both a negative input indication 16N and an affirmative input indication 16A. For instance, FIGS. 1C and 1D depict the notification with a "YES" button that, when selected by a user 10, indicates an affirmative input indication 16A and a "NO" button that, when selected by a user 10, indicates a negative input indication 16B. In other implementations, the notification 204 is an audible notification, such as a tone or a chime (e.g., a non-continuous tone or chime), from a speaker associated with the device 110. For instance, the user 10 or the device administrator sets up an audible sound to be unique for the soft acceptor 200. By being a unique sound, a user 10 may be aware of what it means when he or she hears the sound and yet also able to ignore the audible notification when necessary.

In response to the notification 204, the activator 220 is configured to determine whether an indication 16 by the user 10 corresponds to an affirmative input indication 16, 16A to affirmatively acknowledge the notification 204 (i.e., triggering performance of the action 148) or a negative input indication 16, 16N that indicates that the user 10 does not want the user device 110 to perform the action 148 specified by the query 22. In some configurations, when the activator 220 receives an affirmative input indication 16A, the activator 220 is further configured to determine whether the activator 220 received the affirmative input indication 16A within a predetermined duration of time. Here, the predetermined duration of time corresponds to a window of time that begins when the activator 220 communicates the notification 204 to the user device 110 and ends at a designated end time (e.g., twenty seconds). When the duration of time expires, the activator 220 may remove the notification 204 and/or delete the action 148 (e.g., along with any other data associated with the action 148 such as the spoken utterance 20 that resulted in the action 148). In this respect, when the user 10 fails to provide the affirmative input indication 16A within the predetermined duration of time, the activator 220 does not perform the action 148. In contrast, when the activator 220 receives the affirmative input indication 16A within the predetermined duration of time, the activator 220 allows the action 148 to occur.

In some implementations, the affirmative input indication 16A or the negative input indication 16N are audible commands from the user 10 (e.g., rather than tactile inputs). In these implementations, when the activator 220 receives a speech input from the user 10, the activator 220 determines whether the speech input includes one or more terms characterizing an intent for the user device 110 to perform or to not perform the action 148 specified by the query 22. In order to aid the receipt of audible commands in response to a notification 204, the activator 220 may activate a warm word model without performing speech recognition. Here, the warm word model is configured to detect a presence of either one or more one or more spoken terms characterizing the affirmative input indication 16A or one or more other spoken terms characterizing a negative input indication 16N. Alternatively, the activator 220 may process the receipt of audible commands using the speech recognizer 152. When using the speech recognizer 152, the speech recognizer 152 may operate with reduced functionality. In this respect, reduced functionality refers to a speech recognizer 152 that is at least sufficient to recognize one or more one or more spoken terms characterizing the affirmative input indication 16A or one or more other spoken terms characterizing a negative input indication 16N.

Figure 3:
FIG. 3 is a flow chart of an example arrangement of operations for a method of soft accepting a hot word.
Figure 3:
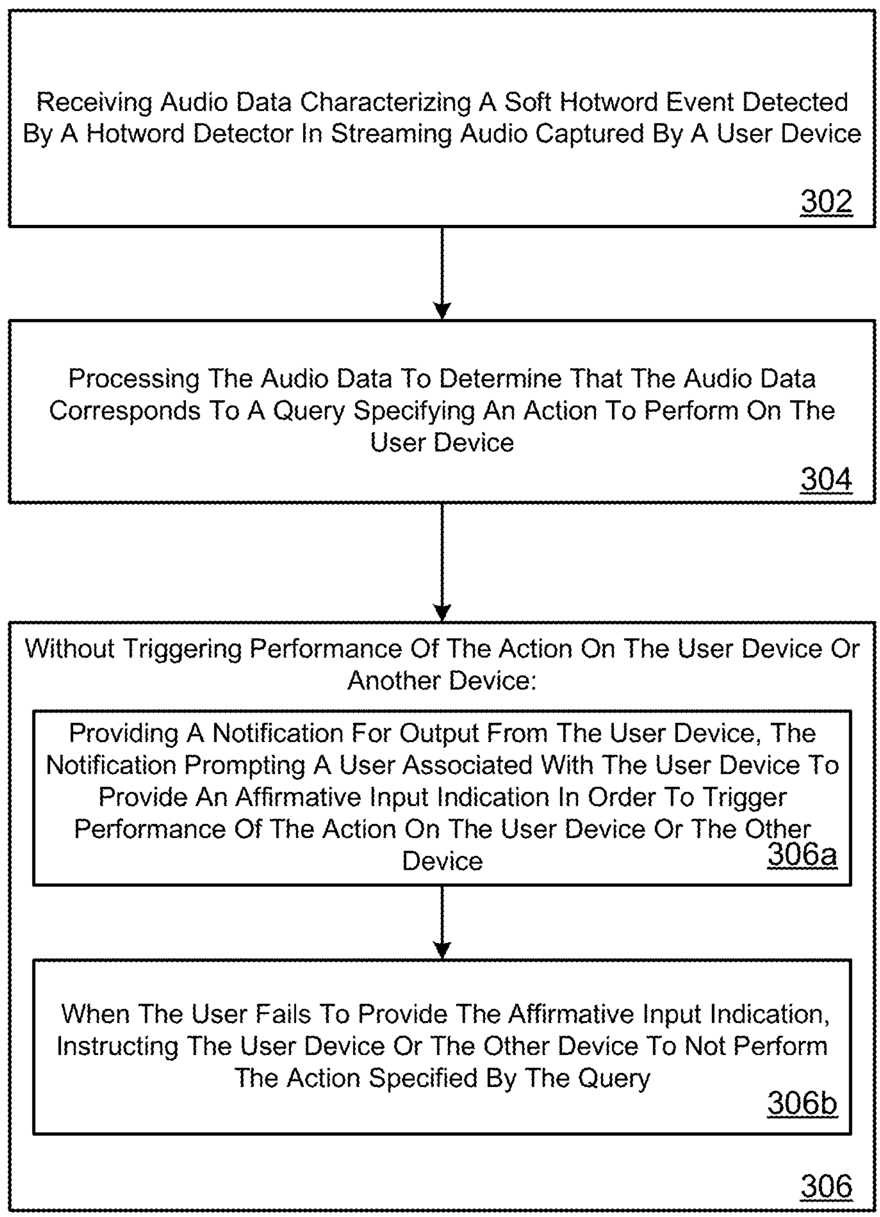

FIG. 3 is a flowchart of an example arrangement of operations for a method 300 of soft accepting a hotword 24. At operation 302, the method 300 receives audio data 14 characterizing a soft hotword event 202 detected by a hotword detector 200 in streaming audio 12 captured by the user device 110. At operation 304, the method 300 processes the audio data 14 to determine that the audio data 14 corresponds to a query 22 specifying an action 148 to perform on the user device 110. Without triggering performance of the action 148 on the user device 110, the method 300, at operation 306, performs two sub-operations 306, 306*a*-*b*. At operation 306*a*, the method 300 provides a notification 204 for output from the user device 110 where the notification 204 prompts a user 10 associated with the user device 110 to provide an affirmative input indication 16 in order to trigger performance of the action 148 on the user device 110. At operation 306*b*, when the user 10 fails to provide the affirmative input indication 16, the method 300 instructs the user device 110 to not perform the action 148 specified by the query 22.

Figure 4:
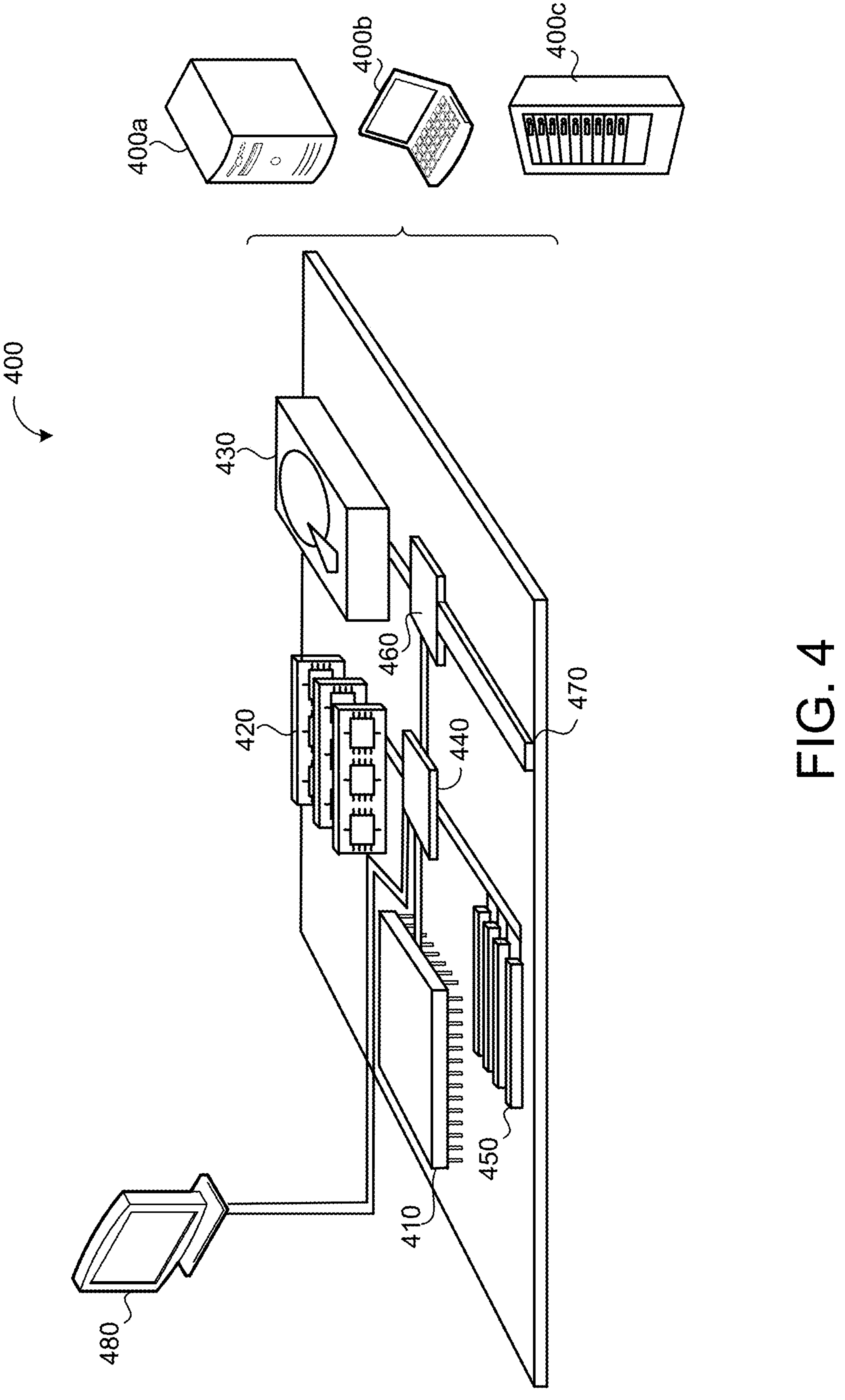
FIG. 4 is a schematic view of an example computing device that may be used to implement the systems and methods described herein.

FIG. 4 is a schematic view of an example computing device 400 that may be used to implement the systems (e.g., the assistant interface 120, the speech processing system 150, the remote system 140, and the soft acceptor 200) and methods (e.g., the method 300) described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410 (e.g., data processing hardware 112, 134), memory 420 (e.g., memory hardware 114, 136), a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400*a* or multiple times in a group of such servers 400*a*, as a laptop computer 400*b*, or as part of a rack server system 400*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
- receiving audio data captured by a user device, the audio data comprising a first audio segment and a second audio segment, the first audio segment comprising a hotword configured to initiate processing of one or more terms following the hotword, the second audio segment comprising an action to perform on the user device or another device;
- determining that the first audio segment characterizes a soft hotword event;
- based on determining that the first audio segment characterizes the soft hotword event, determining that the second audio segment corresponds to a query specifying the action to perform on the user device or the other device; and
- based on determining that the first audio segment characterizes the soft hotword event and determining that the second audio segment corresponds to the query specifying the action to perform on the user device or the other device:
  - providing a notification for output from the user device, the notification prompting a user associated with the user device to provide an affirmative input indication in order to trigger performance on the user device or the other device;
  - activating a warm word model configured to detect, without performing speech recognition, a presence of both of:
    - one or more spoken terms characterizing the affirmative input indication; and
    - one or more other spoken terms characterizing a negative input indication, the negative input indication indicating that the user does not want the user device or the other device to perform the action specified by the query;
  - receiving a speech input comprising the one or more other spoken terms characterizing the negative input indication;

detecting, by the warm word model in the speech input, without performing speech recognition, the one or more other spoken terms characterizing the negative input indication;

determining that the user failed to provide the affirmative input indication based on detecting the one or more other spoken terms characterizing the negative input indication; and based on determining that the user failed to provide the affirmative input indication, instructing the user device or the other device to not perform the action specified by the query.

2. The computer-implemented method of claim 1, wherein the operations further comprise, based on determining that the user failed to provide the affirmative input indication, deleting any storage of the audio data.

3. The computer-implemented method of claim 1, wherein providing the notification for output from the user device comprises instructing a graphical user interface executing on the user device to render the notification as a visual notification for display on a screen of the user device.

4. The computer-implemented method of claim 3, wherein the operations further comprise, based on determining that the user failed to provide the affirmative input indication, instructing the graphical user interface to remove the visual notification displayed on the screen of the user device.

5. The computer-implemented method of claim 1, wherein providing the notification for output from the user device comprises instructing the user device to output the notification as an audible notification from a speaker of the user device.

6. The computer-implemented method of claim 1, wherein the notification provided for output from the user device also prompts the user to provide the negative input indication indicating that the user does not want the user device or the other device to perform the action specified by the query.

7. A system comprising:

data processing hardware; and memory hardware in communication with the data processing hardware, the memory hardware storing instructions that when executed on the data processing hardware cause the data processing hardware to perform operations comprising:

receiving audio data captured by a user device, the audio data comprising a first audio segment and a second audio segment, the first audio segment comprising a hotword configured to initiate processing of one or more terms following the hotword, the second audio segment comprising an action to perform on the user device or another device;

determining that the first audio segment characterizes a soft hotword event;

based on determining that the first audio segment characterizes the soft hotword event, determining that the second audio segment corresponds to a query specifying the action to perform on the user device or the other device; and based on determining that the first audio segment characterizes the soft hotword event and determining that the second audio segment corresponds to the query specifying the action to perform on the user device or the other device:

providing a notification for output from the user device, the notification prompting a user associated with the user device to provide an affirmative input indication in order to trigger performance on the user device or the other device;

activating a warm word model configured to detect, without performing speech recognition, a presence of both of:

one or more spoken terms characterizing the affirmative input indication; and one or more other spoken terms characterizing a negative input indication, the negative input indication indicating that the user does not want the user device or the other device to perform the action specified by the query;

receiving a speech input comprising the one or more other spoken terms characterizing the negative input indication;

detecting, by the warm word model in the speech input, without performing speech recognition, the one or more other spoken terms characterizing the negative input indication;

determining that the user failed to provide the affirmative input indication based on detecting the one or more other spoken terms characterizing the negative input indication; and based on determining that the user failed to provide the affirmative input indication, instructing the user device or the other device to not perform the action specified by the query.

8. The system of claim 7, wherein the operations further comprise, based on determining that the user failed to provide the affirmative input indication, deleting any storage of the audio data.

9. The system of claim 7, wherein providing the notification for output from the user device comprises instructing a graphical user interface executing on the user device to render the notification as a visual notification for display on a screen of the user device.

10. The system of claim 9, wherein the operations further comprise, based on determining that the user failed to provide the affirmative input indication, instructing the graphical user interface to remove the visual notification displayed on the screen of the user device.

11. The system of claim 7, wherein providing the notification for output from the user device comprises instructing the user device to output the notification as an audible notification from a speaker of the user device.

12. The system of claim 7, wherein the notification provided for output from the user device also prompts the user to provide the negative input indication indicating that the user does not want the user device or the other device to perform the action specified by the query.

* * * * *